US011236528B2

United States Patent
Berglund et al.

(10) Patent No.: US 11,236,528 B2
(45) Date of Patent: Feb. 1, 2022

(54) SYSTEMS AND METHODS FOR LOCKING A SENSOR TO A BASE

(71) Applicant: InVue Security Products Inc., Charlotte, NC (US)

(72) Inventors: David N. Berglund, Indian Trail, NC (US); Brent E. Van Camp, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 16/617,260

(22) PCT Filed: May 30, 2018

(86) PCT No.: PCT/US2018/035070
§ 371 (c)(1),
(2) Date: Nov. 26, 2019

(87) PCT Pub. No.: WO2018/222674
PCT Pub. Date: Dec. 6, 2018

(65) Prior Publication Data
US 2020/0141159 A1  May 7, 2020

Related U.S. Application Data

(60) Provisional application No. 62/613,622, filed on Jan. 4, 2018, provisional application No. 62/513,048, filed on May 31, 2017.

(51) Int. Cl.
*F16M 13/02* (2006.01)
*F16M 11/10* (2006.01)
(Continued)

(52) U.S. Cl.
CPC ............ *E05B 73/0052* (2013.01); *A47F 5/02* (2013.01); *E05B 65/00* (2013.01);
(Continued)

(58) Field of Classification Search
CPC ............ E05B 73/0052; E05B 73/0082; E05B 73/0017; E05B 65/00; E05B 29/00;
(Continued)

(56) References Cited

U.S. PATENT DOCUMENTS 2,554,306 A   5/1951   Mack
2,873,822 A   2/1959   Sloan
(Continued)

FOREIGN PATENT DOCUMENTS

WO   2014078966 A1   5/2014
WO   2016033037 A1   3/2016

OTHER PUBLICATIONS

International Search Report and Written Opinion from corresponding International Application No. PCT/US2018/035070, dated Oct. 29, 2018 (13 pages).
(Continued)

*Primary Examiner* — Tan Le
(74) *Attorney, Agent, or Firm* — InVue Security Products Inc.

(57) ABSTRACT

Embodiments of the present invention are directed to merchandise display systems and methods for displaying an article of merchandise. In one example, the system includes a sensor configured to be secured to the article of merchandise. The system also includes a base configured to removably support the sensor thereon. The base includes a lock mechanism configured to lock the sensor to the base.

36 Claims, 14 Drawing Sheets

(51) Int. Cl.

| | |
|---|---|
| *E05B 73/00* | (2006.01) |
| *E05B 47/00* | (2006.01) |
| *A47F 7/00* | (2006.01) |
| *A47F 7/024* | (2006.01) |
| *A47F 5/02* | (2006.01) |
| *E05B 65/00* | (2006.01) |
| *E05B 29/00* | (2006.01) |
| *E05B 31/00* | (2006.01) |
| *F16M 11/04* | (2006.01) |

(52) U.S. Cl.
CPC ........ *E05B 73/0017* (2013.01); *A47F 7/0246* (2013.01); *E05B 29/00* (2013.01); *E05B 31/00* (2013.01); *F16M 11/041* (2013.01); *F16M 13/02* (2013.01)

(58) Field of Classification Search
CPC .......... A47F 5/02; A47F 7/0042; A47F 7/024; F16M 11/105; F16M 13/02; F16M 11/041; G08B 13/14; G06F 21/88
See application file for complete search history.

(56) References Cited

U.S. PATENT DOCUMENTS

| | | | |
|---|---|---|---|
| 4,132,093 A | 1/1979 | McDorman | |
| 4,882,921 A | 11/1989 | Wopinski | |
| 5,543,782 A | 8/1996 | Rothbaum et al. | |
| 5,829,280 A | 11/1998 | Chen | |
| 7,737,845 B2 | 6/2010 | Fawcett et al. | |
| 8,674,833 B2* | 3/2014 | Johnston | A47F 7/024 340/568.1 |
| 9,070,380 B2* | 6/2015 | Sato | G11B 7/0932 |
| 9,220,358 B2* | 12/2015 | Wheeler | F16M 11/105 |
| 9,353,552 B1* | 5/2016 | Kelsch | E05B 73/00 |
| 9,443,404 B2 | 9/2016 | Grant et al. | |
| 9,474,392 B2* | 10/2016 | Howarth | F16M 13/02 |
| 9,747,765 B1 | 8/2017 | Berglund et al. | |
| 9,761,101 B2 | 9/2017 | Berglund et al. | |
| 9,805,564 B1 | 10/2017 | Berglund et al. | |
| 9,811,988 B2 | 11/2017 | Grant et al. | |
| 9,928,704 B2 | 3/2018 | Berglund et al. | |
| 10,043,358 B1 | 8/2018 | Berglund et al. | |
| 10,068,444 B1 | 9/2018 | Berglund et al. | |
| 10,078,945 B2 | 9/2018 | Grant et al. | |
| 10,098,481 B2 | 10/2018 | Berglund et al. | |
| 10,206,522 B2 | 2/2019 | Yang et al. | |
| 10,290,192 B2 | 5/2019 | Grant et al. | |
| 10,403,105 B2 | 9/2019 | Berglund et al. | |
| 10,475,308 B2 | 11/2019 | Grant et al. | |
| 2011/0309934 A1* | 12/2011 | Henson | G08B 13/1472 340/568.2 |
| 2012/0120571 A1 | 5/2012 | Bisesti et al. | |
| 2014/0060218 A1 | 3/2014 | Bisesti et al. | |
| 2014/0106608 A1 | 4/2014 | Howarth et al. | |
| 2014/0118930 A1 | 5/2014 | Sedon | |
| 2014/0362517 A1 | 12/2014 | Moock et al. | |
| 2015/0048625 A1 | 2/2015 | Weusten et al. | |
| 2015/0208826 A1 | 7/2015 | Yang et al. | |
| 2015/0300050 A1 | 10/2015 | Van Balen | |
| 2015/0305518 A1 | 10/2015 | Galant | |
| 2016/0335859 A1 | 11/2016 | Sankey | |
| 2019/0029446 A1 | 1/2019 | Berglund et al. | |

OTHER PUBLICATIONS

Petition for Inter Partes Review of U.S. Pat. No. 10,098,481, dated Oct. 4, 2019, 95 pages.
Excerpts, "Merriam-Webster's Dictionary and Thesaurus, 6th Edition." Merriam-Webster, Incorporated, 2014.
U.S. Appl. No. 61/996,963, filed Jan. 24, 2014.
U.S. Pat. No. 483,298, issued Sep. 27, 1892 to Bruns.
Petition for Inter Partes Review of U.S. Pat. No. 10,098,481, dated Oct. 4, 2019, 95 pages (IPR2020-00018).

* cited by examiner

SYSTEMS AND METHODS FOR LOCKING A SENSOR TO A BASE

CROSS REFERENCE TO RELATED APPLICATIONS

This application is a 371 National Phase entry of International Application No. PCT/US2018/035070, filed on May 30, 2018, which claims the benefit of and priority to U.S. Provisional Application No. 62/513,048 filed on May 31, 2017, and to U.S. Provisional Application No. 62/613,622 filed on Jan. 4, 2018, the entire disclosures of which are incorporated herein by reference.

FIELD OF THE INVENTION

Embodiments of the present invention relate generally to security systems and methods for articles of merchandise in a retail environment.

BACKGROUND OF THE INVENTION

Retailers routinely display articles of merchandise, such as telephones, portable computers (e.g. notebooks, laptops, tablets, etc.), and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

BRIEF SUMMARY

Embodiments of the present invention are directed towards merchandise display systems and methods for displaying an article of merchandise. In one embodiment, a merchandise display system comprises a sensor configured to be secured to the article of merchandise, the sensor comprising a first engagement member. The merchandise display system also includes a base configured to removably support the sensor thereon, the base defining an opening configured to receive a portion of the sensor therein. In addition, the merchandise display system includes a lock mechanism comprising at least one second engagement member configured to releasably engage the first engagement member configured to lock the sensor to the base, and a rotatable mechanism extending about the opening and configured to actuate the lock mechanism. The rotatable mechanism is configured to rotate about the opening, and wherein rotation of the rotatable mechanism is configured to cause the at least one second engagement member to move either into engagement with the first engagement member for locking the sensor on the base in a locked position or out of engagement with the first engagement member in an unlocked position.

In another embodiment, a merchandise display system includes a sensor configured to be secured to the article of merchandise and a base configured to removably support the sensor thereon, the base defining an opening configured to receive a portion of the sensor therein. The merchandise display system further includes a lock mechanism configured to lock the sensor to the base and a rotatable mechanism extending about the opening and configured to actuate the lock mechanism. The rotatable mechanism is configured to rotate about the opening, and wherein rotation of the rotatable mechanism is configured to cause the lock mechanism to lock the sensor on the base in a locked position or unlock the sensor from the base in an unlocked position.

In another embodiment, a merchandise display system includes a sensor configured to be secured to the article of merchandise and a base configured to removably support the sensor thereon, the base defining an opening configured to receive a portion of the sensor therein. The merchandise display system includes a lock mechanism configured to lock the sensor to the base and a cam mechanism extending about the opening and configured to actuate the lock mechanism, wherein the cam mechanism is configured to rotate circumferentially about the opening, and wherein rotation of the rotatable mechanism is configured to cause the lock mechanism to lock the sensor on the base in a locked position or unlock the sensor from the base in an unlocked position.

In another embodiment, a merchandise display system includes a sensor configured to be secured to the article of merchandise and a base configured to removably support the sensor thereon, the base defining an opening configured to receive a portion of the sensor therein. The merchandise display system also includes a lock mechanism comprising at least one engagement member configured to lock the sensor to the base and a rotatable mechanism extending about an axis of the opening and configured to actuate the lock mechanism. The rotatable mechanism is configured to rotate about the axis of the opening, and wherein rotation of the rotatable mechanism is configured to cause the at least one engagement member to move to either lock the sensor on the base in a locked position or unlock the sensor from the base in an unlocked position.

In another embodiment, a merchandise display system includes a sensor configured to be secured to the article of merchandise and a base configured to removably support the sensor thereon, the base defining an opening configured to receive a portion of the sensor therein. The merchandise display system further includes a lock mechanism configured to lock the sensor to the base, the lock mechanism comprising a key receptacle and a shuttle configured to move between engaged and disengaged positions with the key receptacle. The merchandise display system also includes a key configured to engage the key receptacle for causing the shuttle to engage the key receptacle, the shuttle configured to disengage the key receptacle when the key is removed from the key receptacle. The key is configured to move the key receptacle to actuate the lock mechanism to lock the sensor on the base in a locked position or unlock the sensor from the base in an unlocked position while the shuttle is engaged with the key receptacle.

In another embodiment, a method includes securing a sensor to the article of merchandise and positioning the sensor on a base, the base configured to removably support the sensor thereon and defining an opening configured to receive a portion of the sensor therein. The method also includes actuating a lock mechanism to lock the sensor to the base, a rotatable mechanism extending about the opening and configured to actuate the lock mechanism, wherein the rotatable mechanism is configured to rotate about the opening, and wherein rotation of the rotatable mechanism is configured to cause the lock mechanism to lock the sensor on the base in a locked position or unlock the sensor from the base in an unlocked position.

DETAILED DESCRIPTION OF EMBODIMENTS OF THE INVENTION

One or more embodiments of a system for securing an article of merchandise are described below and shown. The article of merchandise M is typically a display model or an operational sample of electronic merchandise, such as portable telephones, smart phones, computers (e.g. notebooks, laptops, tablets, etc.), e-readers, media players, and the like, for a customer to examine before making a decision to purchase the article. The article of merchandise is typically displayed in a manner that permits a prospective purchaser to evaluate the operation and features of the merchandise, while protecting the merchandise from a potential thief. In one embodiment, a sensor with alarming circuitry may be attached to the article of merchandise for detecting various alarming conditions, such as the article being removed from the sensor. A tether may be operably engaged with the sensor at one end, while the opposite end may be secured to a base or other display surface. As explained in further detail below, the alarming circuitry of the sensor may also be configured to detect an alarming condition of the tether, such as cutting or detaching the tether.

Figure 1:
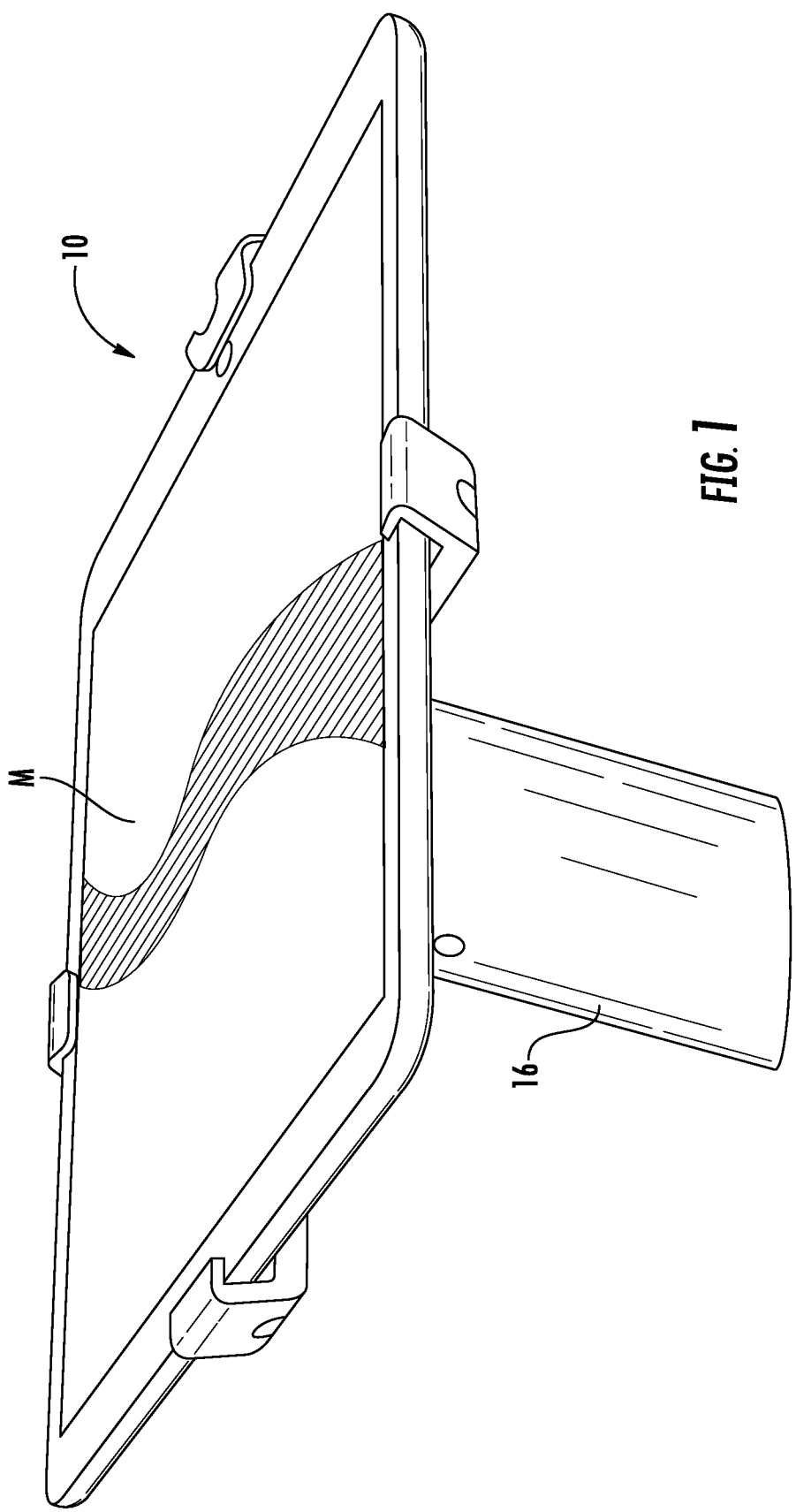
FIG. 1 is a perspective view of a merchandise security system according to one embodiment of the present invention.
Figure 2:
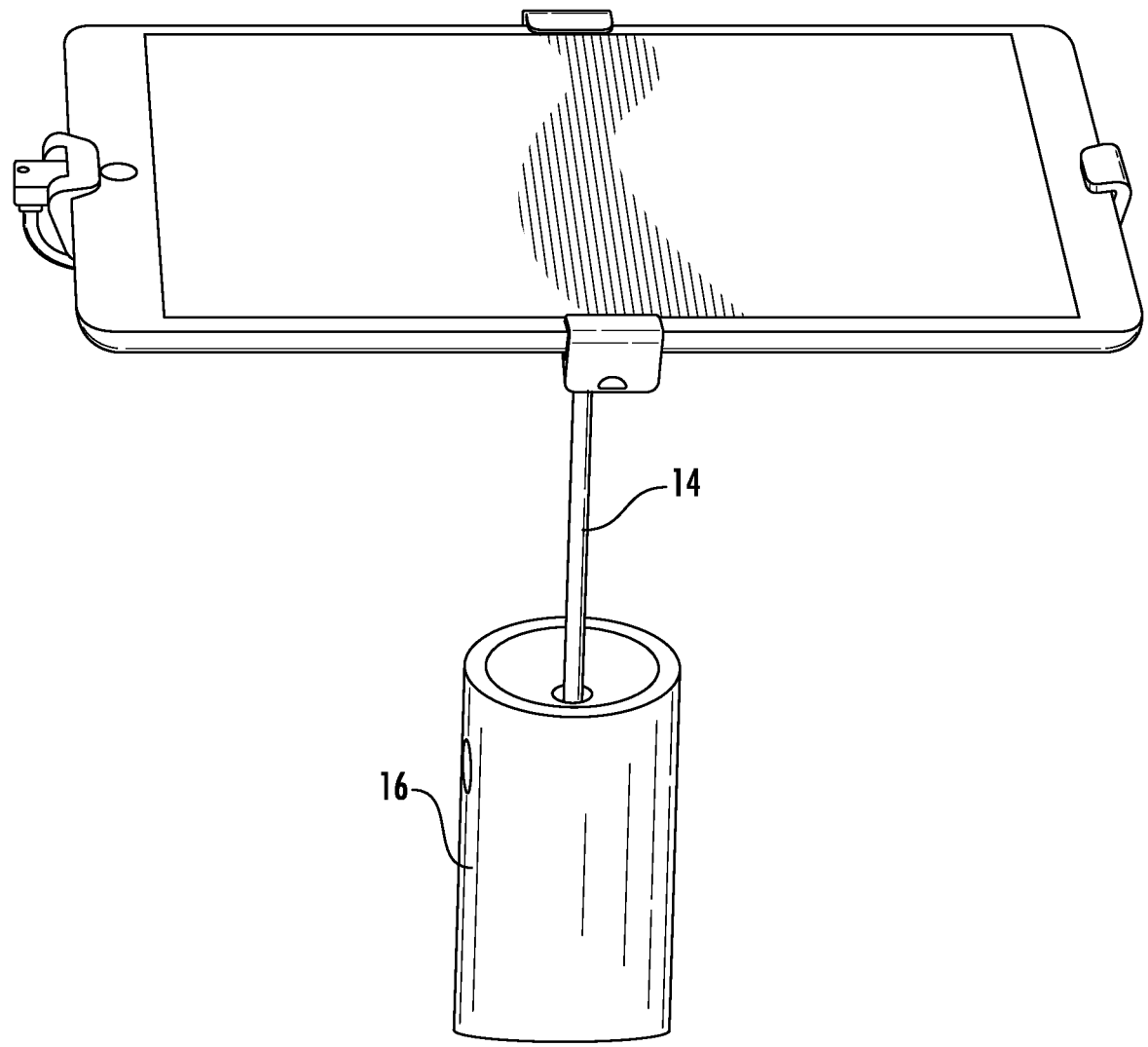
FIG. 2 is a front perspective view of the merchandise security system shown in FIG. 1.
Figure 3:
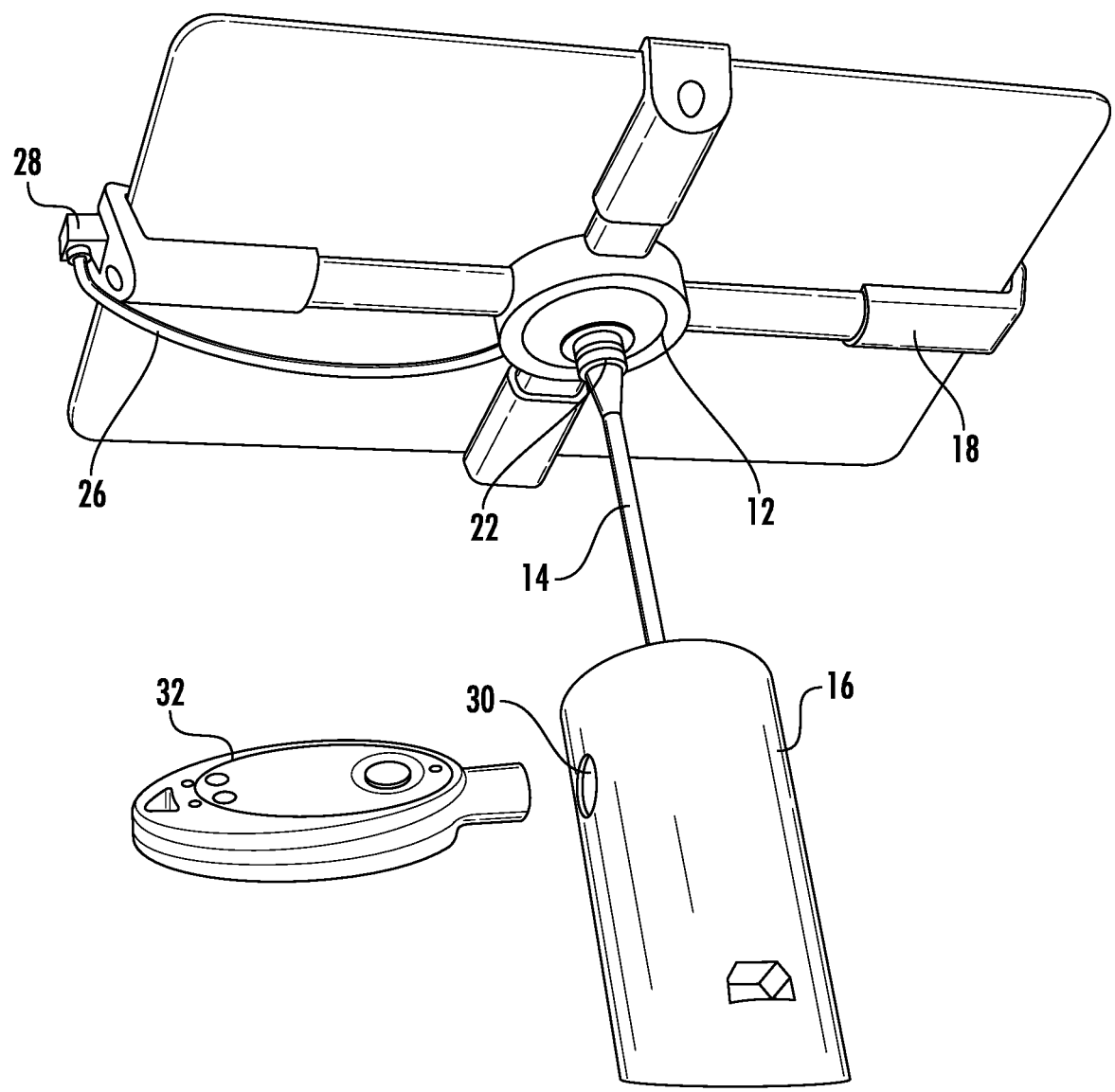
FIG. 3 is a rear perspective view of the merchandise security system shown in FIG. 1.
Figure 4:
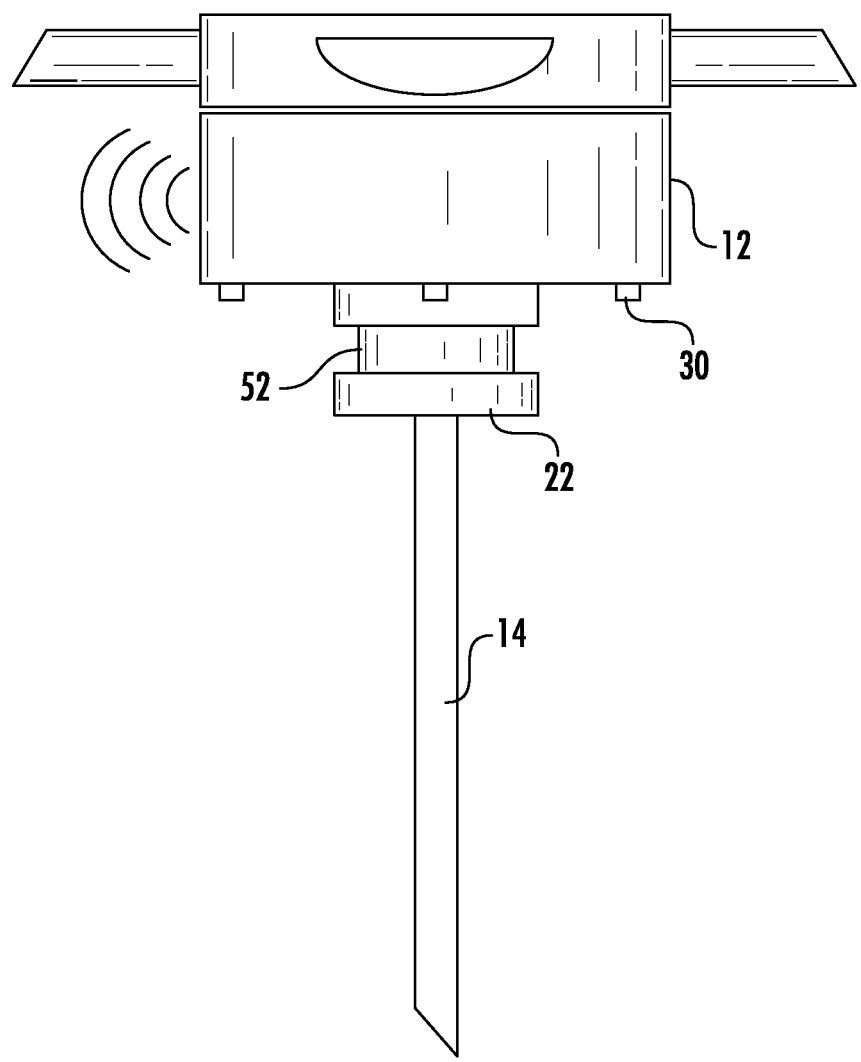
FIG. 4 is a side view of a sensor according to one embodiment of the present invention.
Figure 5:
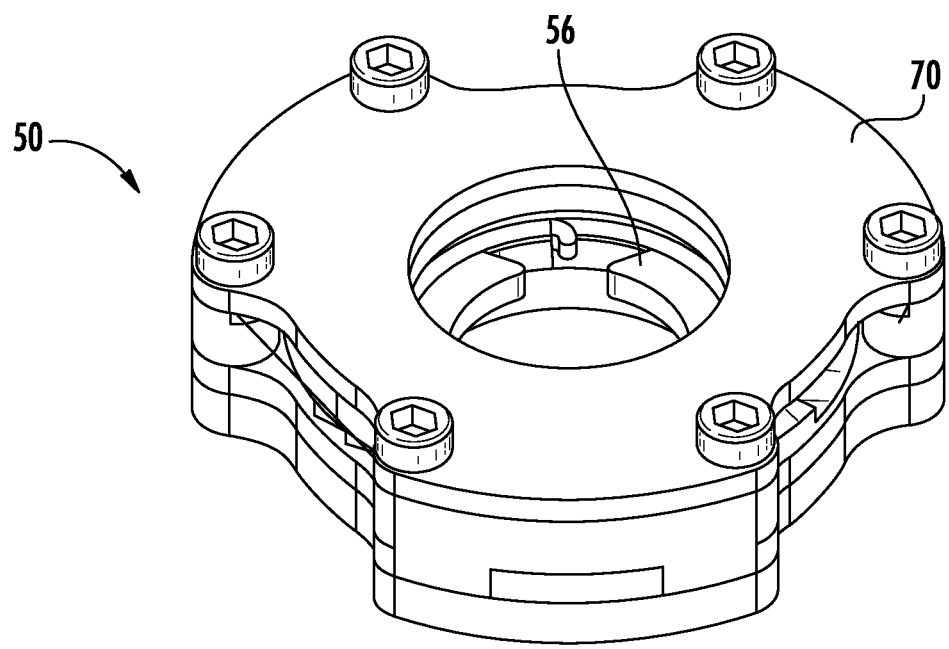
FIG. 5 is a perspective view of a lock mechanism according to one embodiment of the present invention.

FIGS. 1-4 illustrate embodiments of a merchandise security system 10 for securing an article of merchandise M from theft or unauthorized removal. The system generally includes a sensor 12, a tether 14, and a base 16. The sensor 12 is configured to be secured to the article of merchandise M, such as with a pressure-sensitive adhesive (not shown) and/or one or mechanical bracket arms 18. One end of the tether 14 may be electrically connected to the base 16, while the opposite end of the tether 14 includes a connector or jack 22. The sensor 12 may be electrically connected to the tether 14, such as with the connector 22 as shown in FIGS. 3-4. Thus, the connector 22 may be releasably secured to the sensor 12 to establish electrical communication therebetween, such as via a threaded engagement or a lock mechanism.

The base 16 is configured to removably support the sensor 12 thereon such that the sensor 12 and article of merchandise M may be removed from the base 16 for inspection and returned to the base 16. The base 16 may define an opening therethrough that allows the tether 14 to extend and retract relative to the base 16. In some cases, the base 16 may house a recoiler therein configured to retract the tether 14 into the base as well as allow extension of the cable from the base. The base 16 may define an opening configured to receive the tether 14 therethrough (see, e.g., FIG. 2). Moreover, the recoiler may be secured below a support surface (e.g., a counter, shelf, or the like). The recoiler may be electrically connected to a power source that is configured to provide power to the recoiler 18 and to the tether 14. In yet other embodiments, the sensor 12 and base 16 may be connected by a tether 14 that is external to the base 16 (e.g., with a coiled cord). In some embodiments, the sensor 12 is electrically connected to a power cable 26 that is configured to provide power to the article of merchandise M. Thus, the power cable 26 may facilitate use of the article of merchandise M on display and charging of the article's battery. FIG. 3 shows that the power cable 26 may include a connector 28 that is configured to operably engage an input port on the article of merchandise M. The alarming circuitry may be configured to detect removal of the connector 28 in some embodiments for generating an audible and/or a visual alarm.

As discussed above, the sensor 12 may include alarming circuitry, processor, central processing unit, or the like that is configured to determine whether various security events have occurred for generating an audible and/or a visual alarm. The sensor 12 may also include an alarm (e.g., a piezoelectric device) that is configured to generate an audible alarm. Thus, the sensor 12 may be configured as "alarm-on-product" whereby the sensor is configured to alarm when attached to the article of merchandise M or detached from the article of merchandise. In some cases, the sensor 12 may include a visual indicator (e.g., an LED) for emitting a visual signal when the alarming circuitry is armed and/or alarming. Moreover, the sensor 12 and/or base 16 may include a transfer port 30 that is configured to communicate with a key 32 for arming and/or disarming the alarming circuitry (see, e.g., FIG. 3). In one embodiment, the transfer port 30 is configured to communicate wirelessly with a key 32 in order to determine whether the key is authorized to arm and/or disarm the alarming circuitry. According to some embodiments, the key is similar to that described in U.S. Pat. No. 7,737,845, the contents of which are hereby incorporated by reference in their entirety.

According to one embodiment, the sensor 12 may include a pressure switch or the like that is configured to detect when the article of merchandise has been removed from the sensor. The alarming circuitry may be configured to detect the removal of the article M and generate and an audible and/or a visual alarm in response thereto. In some embodiments, the alarming circuitry may be also or alternatively be located in the base 16 or at another location. For instance, the sensor 12 and the alarming circuitry may be electrically connected with one another, such as via one or more conductors extending through the tether 14.

Some embodiments of the present invention provide for the delivery of power to the article of merchandise M and/or the sensor 12 through a plurality of conductors in the tether 14. In some examples, the tether 14 includes only two conductors (e.g., a positive power line and a ground line). An input power source may be in electrical communication with the conductors for transmitting power through the tether 14 and to the sensor 12 and/or the article of merchandise M. In other embodiments, the delivery of power may occur via one or more electrical contacts 30 on the sensor 12 and the base 16. Thus, power may be configured to be transferred to the sensor 12 from the base 16 when the sensor is seated on the base.

In some embodiments, the sensor 12 may be configured to be engaged by the base 16 using a lock mechanism 50 (see, e.g., FIGS. 5-10). The lock mechanism 50 may be configured to lock and/or unlock in response to receiving electrical power, such as via an electronic key 32. In one example, the lock mechanism 50 is at least partially housed within the base 16. In some embodiments, the lock mechanism 50 may be configured to actuated using a mechanical key or the like. In the instance where an electronic key 32 is utilized, the base 16 may be configured to detect a number and/or sequence of activations of the key (e.g., key presses) to determine whether to arm or disarm the alarming circuitry and/or to lock or unlock the lock mechanism 50. For example, one activation of the key 32 may cause the alarming circuitry to disarm while a second activation of the key may cause both the alarming circuitry to disarm and the lock mechanism 50 to unlock.

Figure 7:
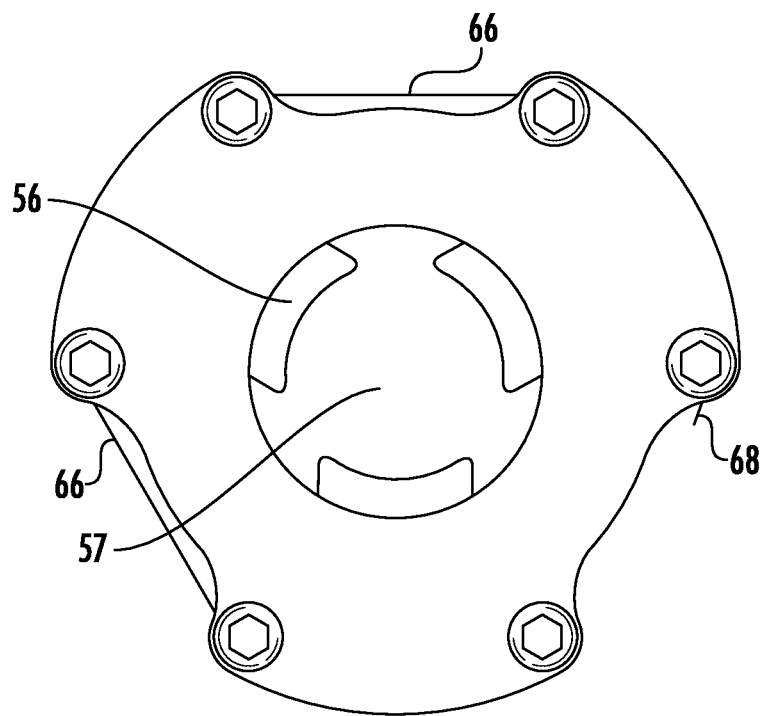
FIG. 7 is a top view of the lock mechanism shown in FIG. 5 in a locked position.
Figure 8:
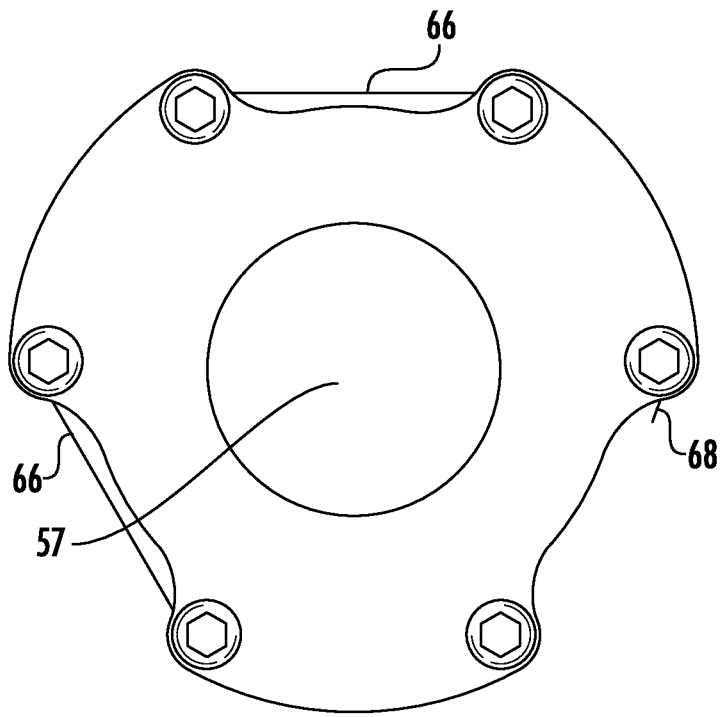
FIG. 8 is a top view of the lock mechanism shown in FIG. 5 in an unlocked position.
Figure 9:
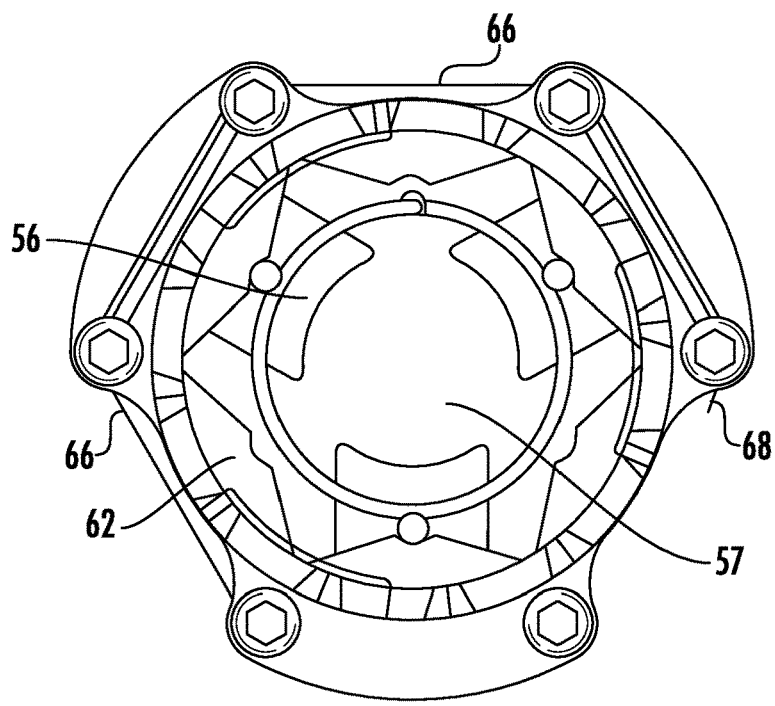
FIG. 9 is a partial top view of the lock mechanism shown in FIG. 5 in a locked position.

In one embodiment, the sensor 12 or connector 22 includes at least one first engagement member 52, while the lock mechanism 50 includes at least one second engagement member 56. In the illustrated example shown in FIG. 4, the first engagement member 52 is a slot, recess, indentation or the like defined in the connector 22 that extends at least partially about the circumference of the connector. The slot may extend about the entire circumference of the connector 22 in some embodiments. The second engagement 56 member is configured to engage the first engagement member 52. The second engagement member 56 may be a biased member that is configured to be biased into engagement with the first engagement member 52. Alternatively, the second engagement member 56 may be biased towards a disengaged position. Thus, the second engagement member 56 may be a spring-biased member. FIGS. 7 and 9 show a top view of the lock mechanism 50 and that the second engagement member 56 may extend within an opening 57 defined through the lock mechanism in a locked position, while in FIGS. 8 and 10, the second engagement member is recessed within the lock mechanism in an unlocked position. The second engagement member 56 may be biased to automatically engage the first engagement member 52 when the sensor 12 is placed on the base 16. Thus, as the sensor 12 is moved to a seated position on the base 16, the second engagement member 56 may bias into engagement with the first engagement member 52. In other embodiments, the second engagement member 56 may be actuated into engagement with one another, such as under operation of an electronic key 32 or the like.

In some cases, the second engagement member 56 may engage the first engagement member 52 at a plurality of locations. In one embodiment, the second engagement member 56 engages the first engagement member 52 at a plurality of locations. For example, FIGS. 5-10 show three second engagement members 56.

When the second engagement member 56 is in engagement with the first engagement member 52, the sensor 12 is locked to the base 16. Thus, the sensor 12 may not be removed from the base 16 without disassembly or otherwise damaging the sensor and/or base. In the locked position, however, the sensor 12 may be rotatable about the base 16. Thus, the sensor 12 and associated article of merchandise M may rotate at least partially about the base 16 (e.g., at least about 90 degrees), and may even rotate freely about the base. As such, even when in a locked position, a consumer is able to interact with the article of merchandise M including moving the article of merchandise between different display orientations.

Figure 6:
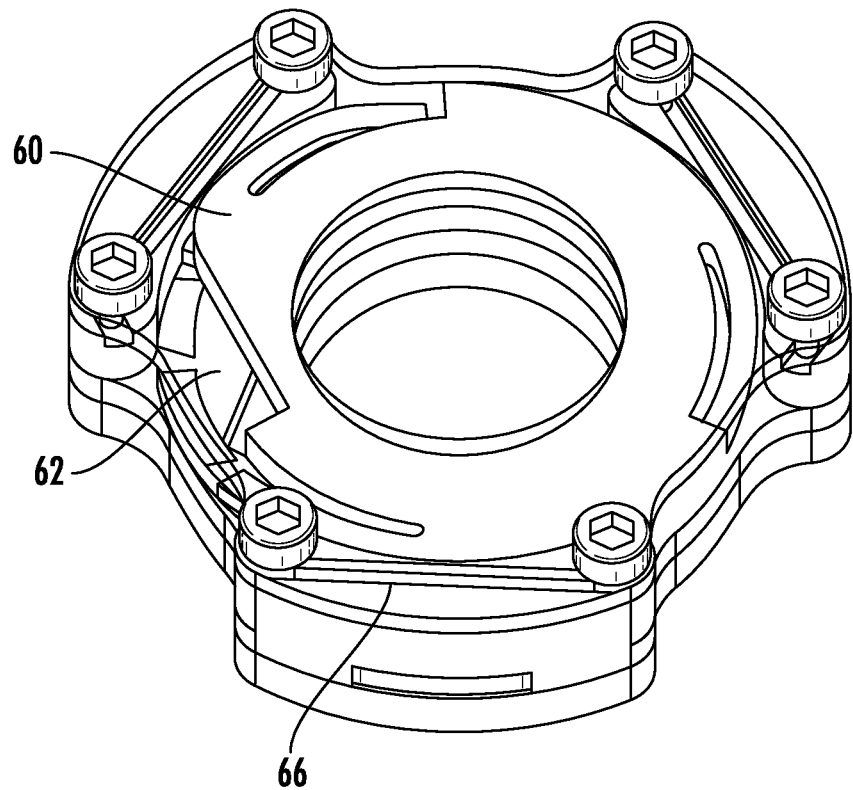
FIG. 6 is a partial perspective view of the lock mechanism shown in FIG. 5.
Figure 10:
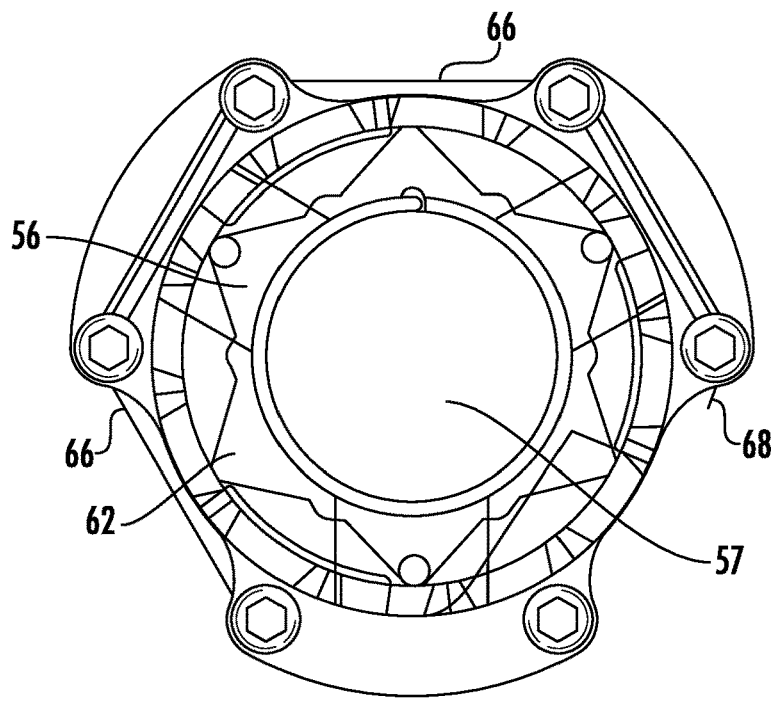
FIG. 10 is a partial top view of the lock mechanism shown in FIG. 5 in an unlocked position.

In one embodiment, the lock mechanism 50 is configured to move sequentially between locked and unlocked positions. In this regard, FIG. 6 shows that the lock mechanism 50 includes a driver 60 and an actuator 62 (e.g., a cam mechanism). One end of a shape memory wire 66 is coupled to the driver 60, while an opposite end 68 of the shape memory wire is anchored to the lock mechanism 50. The driver 60 and cam mechanism 62 are configured to rotate relative to one another. For example, actuation of the shape memory wire 66 may result in rotation of the driver 60 (e.g., in a clockwise direction), which in turn rotates the cam mechanism 62 in the same direction (e.g., in a clockwise direction). Rotation of the cam mechanism 62 causes the engagement members 56 to move to either a locked position or an unlocked position. Following actuation of the driver 60, the driver is configured to rotate in an opposite direction (e.g., a counterclockwise direction) back to its initial position, and in some cases, the driver may be spring biased to its initial position. As shown in FIGS. 9-10, rotation of the cam mechanism 62 may cause the engagement members 56 to extend outwardly from the lock mechanism 50 and inwardly within the opening 57 to a locked position, or to retract the engagement members 56 within the lock mechanism to an unlocked position. Thus, the camming geometry of the cam mechanism 62 facilitates extension and retraction of the engagement members 56 as the cam mechanism is rotated. In some cases, the driver 60 and cam mechanism 62 may cooperate in a ratcheting manner wherein the driver is configured to advance the cam mechanism with each actuation of the cam mechanism. Although the actuator 62 has been described as a cam mechanism, it is understood that other mechanisms may be employed in other embodiments.

As noted above, an end of the shape memory wire 66 may be coupled to the driver 60, while the opposite end of the shape member wire is not required to also be coupled to the driver. The driver 60 may include one or more electrical contacts for facilitating an electrical connection with a printed circuit board (PCB) 70 of the lock mechanism 50. The electrical contacts may be electrical traces such that the driver 60 and PCB 70 maintain electrical contact as the driver is rotated relative to the PCB. In some cases, the driver 60 may comprise an electrically conductive material (e.g., copper), while the PCB 70 includes one or more electrical contacts or traces for establishing an electrical connection therebetween. Moreover, in one example, the end 68 of the shape memory wire 66 anchored to the lock mechanism 50 may be further coupled to a spring that allows the end of the shape memory wire to flex in response to impact forces applied to the base 16 and/or lock mechanism 50 to thereby prevent the end of the shape memory wire from breaking.

As discussed above, the lock mechanism 50 may include a shape memory wire 66 (e.g., a Nitinol wire) such that electrical power transferred from an electronic key 32 (or other power source) results in a change in shape of the shape memory material. Such a change in shape may cause a mechanical actuation of the lock mechanism 50 to thereby lock or unlock the lock mechanism. It is understood that any number of lock mechanisms 50 may be employed, including in conjunction with various forms of power transfer for actuating a lock mechanism (e.g., inductive, capacitive, etc.). For example, where a shape memory material is utilized, a change in shape of the shape memory material may cause mechanical actuation (e.g., linear and/or rotary movement) of the lock mechanism 50. The shape memory material may be operably engaged with a lock mechanism 50 in any number of configurations to facilitate such actuation. Moreover, the shape memory material may be any suitable material, such as a metal, a polymer, or a combination thereof, that is configured to change in shape (e.g., length, area, etc.) in response to a current or a change in temperature. In addition, other mechanisms may be utilized for actuating a lock mechanism, including mechanical, electrical, and/or chemical state changes. In other embodiments, the lock mechanism 50 may cooperate with a motor or solenoid for operating the lock mechanism.

Figure 11:
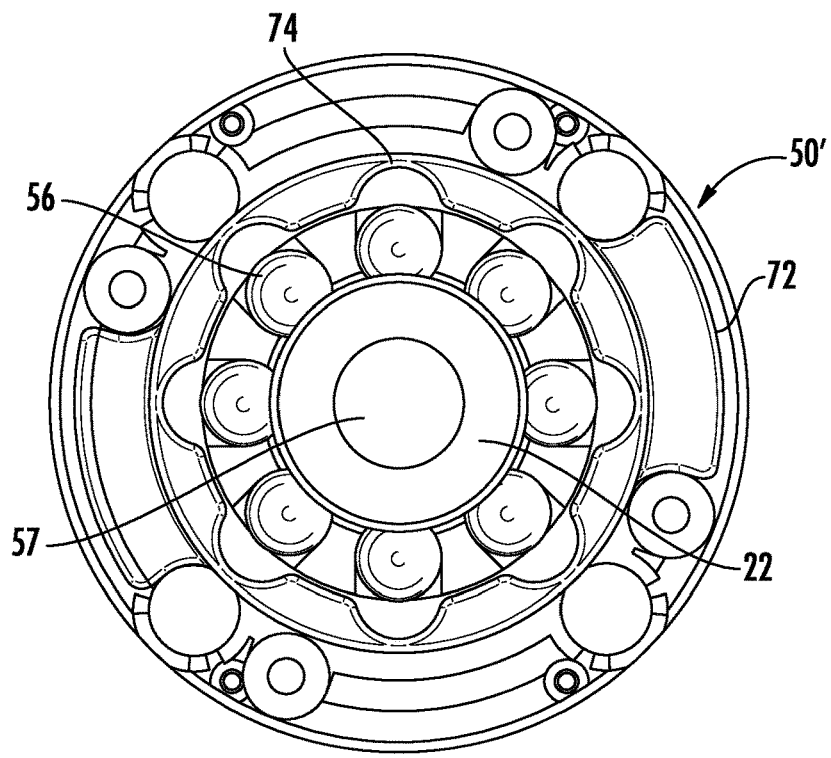
FIG. 11 is a top view of a lock mechanism according to another embodiment of the present invention.
Figure 12:
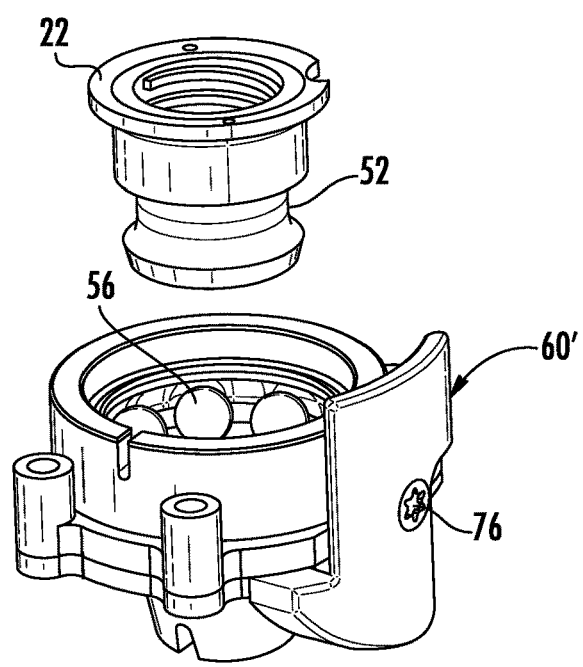
FIG. 12 is an exploded perspective view of a connector and the lock mechanism shown in FIG. 11.
Figure 13:
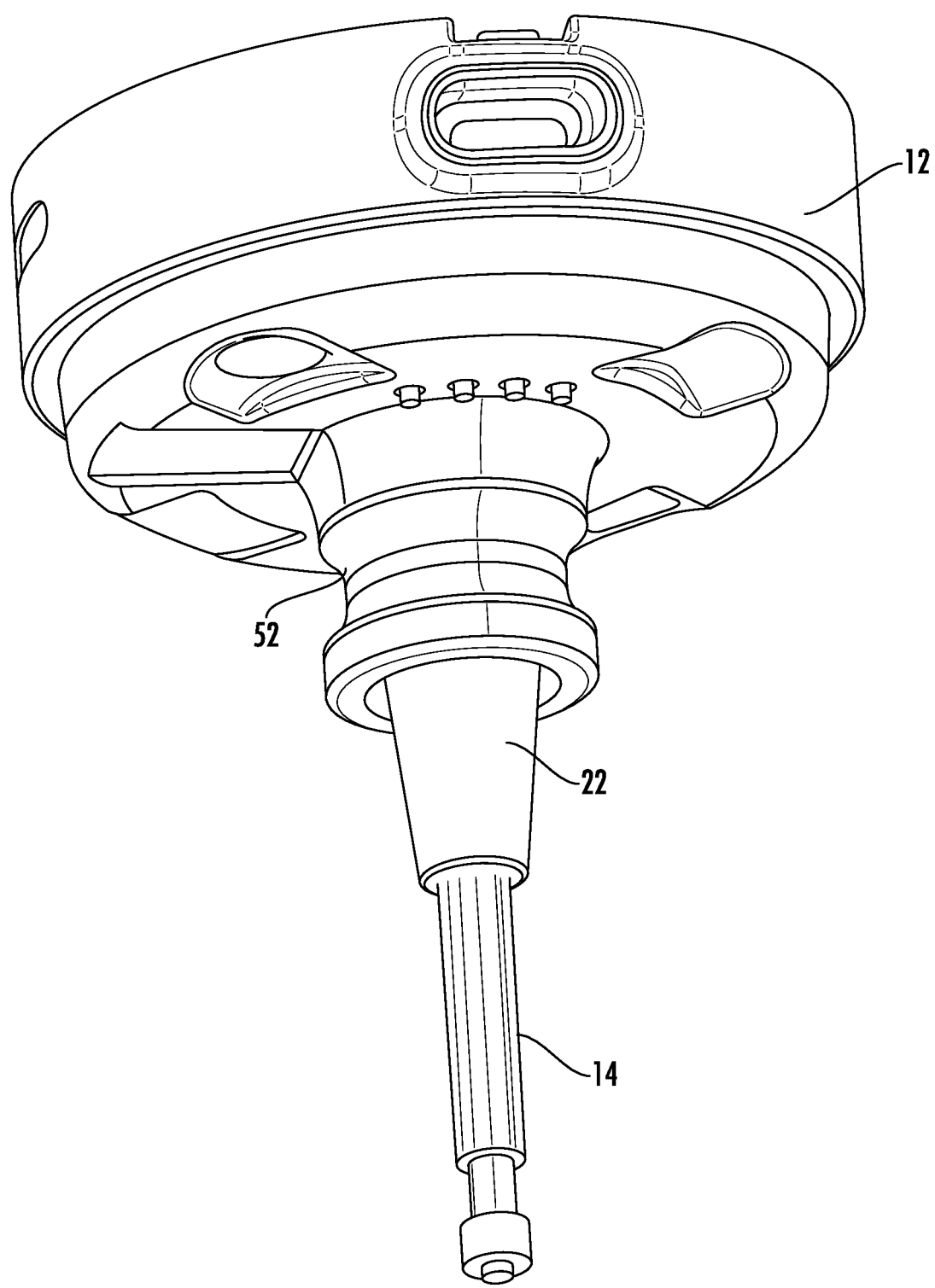
FIG. 13 is a perspective view of a sensor according to one embodiment of the present invention.
Figure 14:
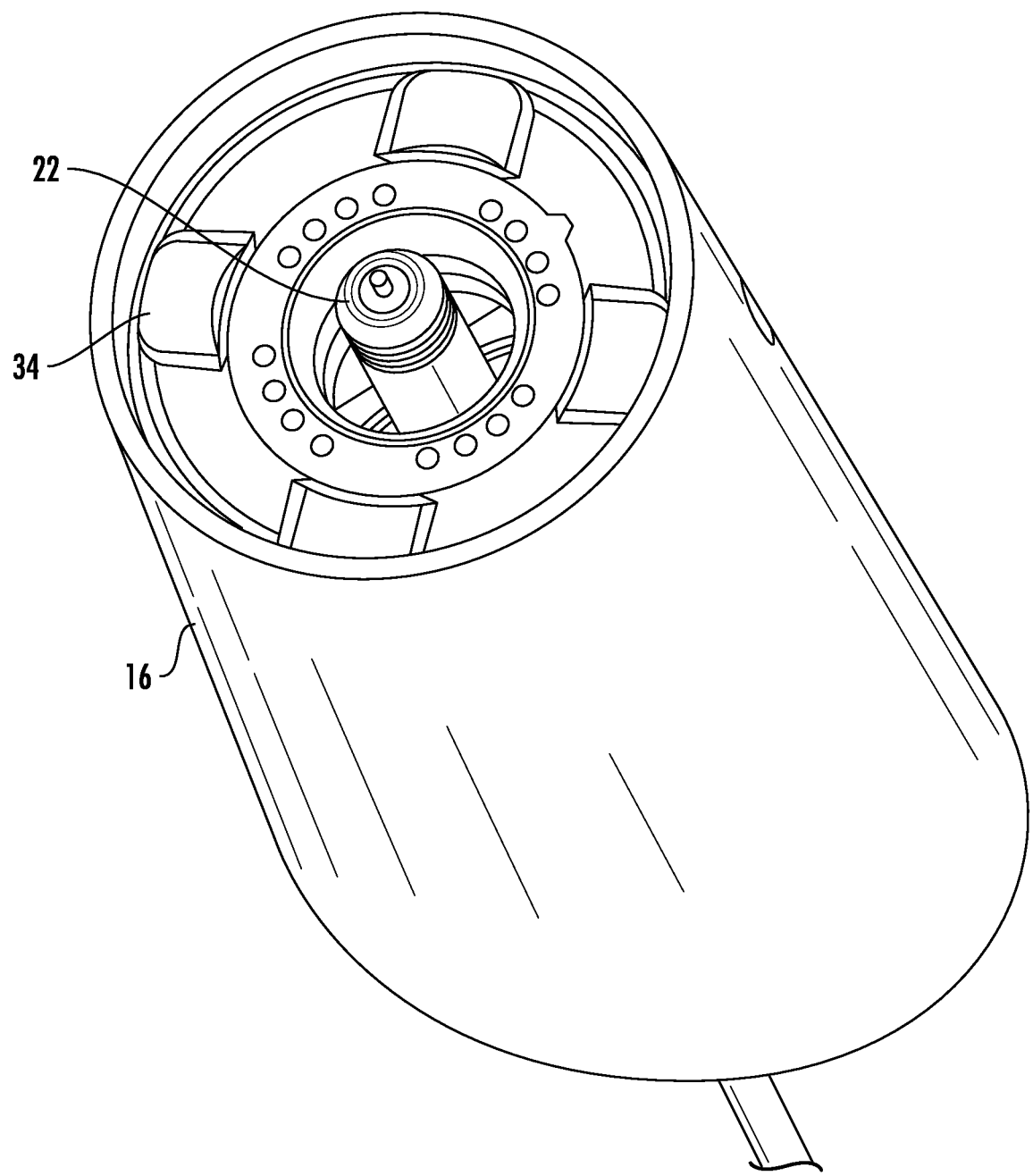
FIG. 14 is a perspective view of a base according to one embodiment of the present invention.
Figure 15:
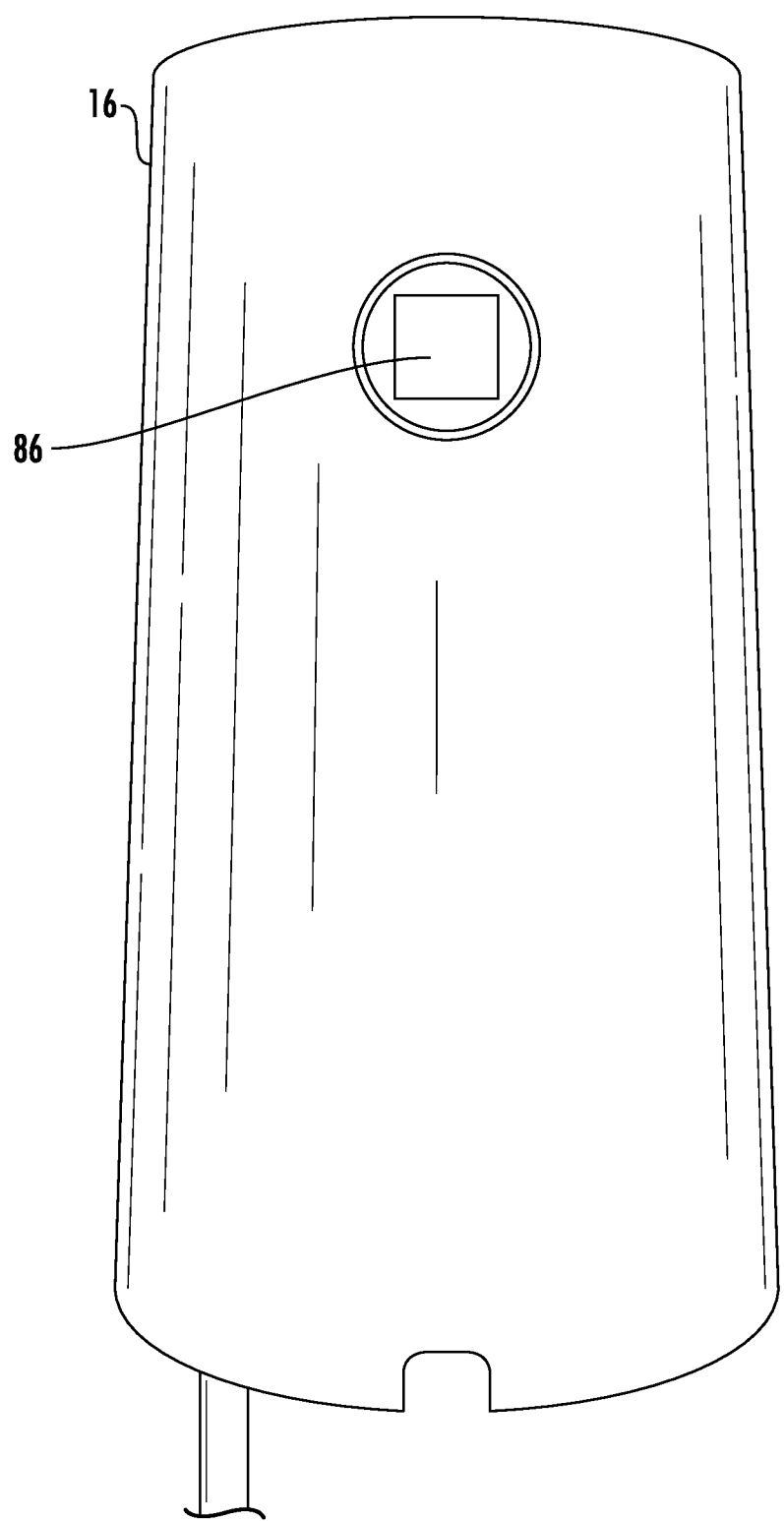
FIG. 15 is a side view of the base shown in FIG. 14.
Figure 16:
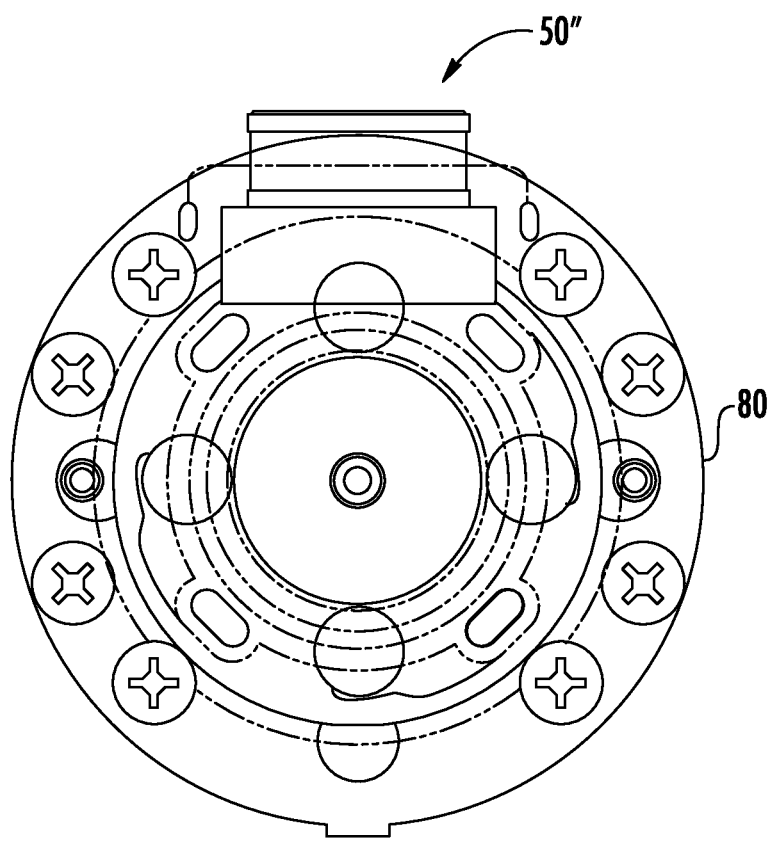
FIG. 16 is a top view of a lock mechanism according to one embodiment of the present invention.
Figure 17:
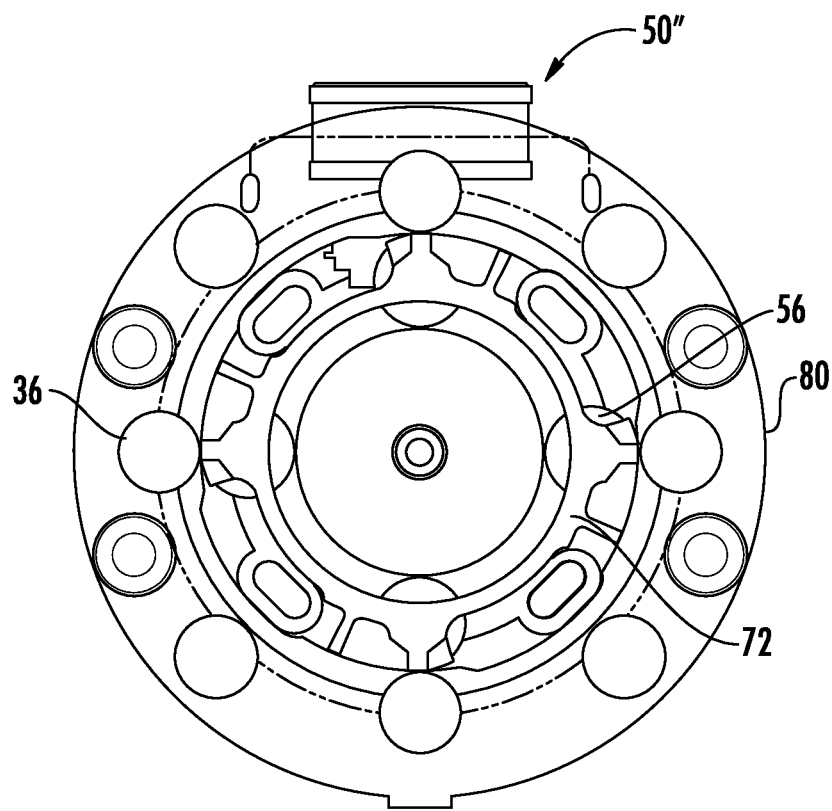
FIG. 17 is a partial top view of the lock mechanism shown in FIG. 16.

FIGS. 11-12 show another embodiment of a lock mechanism 50'. In this embodiment, the second engagement members 56 are a plurality of spherical members that are configured to engage and disengage the first engagement member 52 of the connector 22. In this regard, there may be a plurality of second engagement members 56 disposed about the circumference of the opening 57. The second engagement members 56 are configured to move radially inwardly into engagement with the first engagement member 52 in a locked position and to move radially outwardly out of engagement with the first engagement member in an unlocked position. Various mechanisms or actuators may be employed to move the second engagement members 56 between locked and unlocked positions, such as a cam mechanism 72. For instance, FIG. 11 shows that the cam mechanism 72 may include a plurality of recesses 74 each configured to receive a respective second engagement member 56 in an unlocked position. When actuated to a locked position, the cam mechanism 72 is configured to move each of the second engagement members 56 into engagement with the first engagement member 52 and to thereby prevent the second engagement members from returning to the unlocked position. In some embodiments, the cam mechanism 72 is configured to rotate to move the second engagement members to a locked or unlocked position.

The lock mechanism 50' may be actuated using a variety of methods. For example, an actuator 60' may be configured to move the cam mechanism 72 between locked and unlocked positions. In some cases, less than a full revolution of the actuator 60' may be configured to actuate the second engagement members 56 (e.g., a quarter or half turn). In some cases, the actuator 60' may include a fastener 76 coupled to a latch. Rotation of the fastener 76 is configured to rotate the latch, which in turn actuates the cam mechanism 72 to a locked or unlocked position. A key may be employed to actuate the actuator 60', such as a mechanical, magnetic, or electronic key. In one embodiment, the actuator 60' may be modular or interchangeable in that different actuator types may be used as desired. For instance, a mechanical actuator 60' may be used as shown in the illustrated embodiment, however, an electrical actuator 60' may be used in other embodiments by removing the mechanical actuator 60' and coupling the electrical actuator to the lock mechanism 50'. In some cases, a motor, solenoid, and/or shape memory material may be employed with the actuator 60' to facilitate locking or unlocking the lock mechanism 50'.

FIGS. 13-20 illustrate another embodiment of a merchandise security system including a sensor 12, a base 16, and a lock mechanism 50" for locking the sensor to the base. In this embodiment, a plurality of engagement members 56 are retained by or otherwise seated on a retaining member 80. In this example, the engagement members 56 are spherical in shape and may be ball bearings. Four engagement members 56 are spaced from one another at 90 degree locations about the circumference of the retaining member 80, although any number of engagement members 56 may be employed. However, engagement members 56 that engage the sensor 14 about the circumference of the engagement member 52 create a more secure connection than if only one engagement member 56 is used or if the engagement members 56 do not uniformly or symmetrically engage the engagement member 52. A camming mechanism 72 or like mechanism is configured to move the engagement members 56 into or out of engagement with the engagement member 52 of the sensor 12. Thus, when the camming mechanism 72 is moved in a clockwise or counterclockwise direction, the engagement members 56 may be moved to a locked or unlocked position. In some cases, the engagement members 56 may be configured to move radially into engagement with the engagement member 52 and/or radially out of engagement.

The base 16 may include one or more magnets 34 or magnetic material, and the sensor 12 may include one or more magnets or magnetic material for releasably holding the sensor on the base. The magnets 34 may aid in aligning the item of merchandise in a desired display orientation when the sensor 12 is seated on the base 16. Furthermore, in one embodiment, the base 16 may include magnets 36 used to facilitate disengagement of the engagement members 56 from the engagement member 52. In this regard, in the locked position, the engagement members 56 cannot be moved to the unlocked position due to the configuration of the camming mechanism 72. For example, in the locked position, a portion of the camming mechanism 72 may be positioned between the engagement members 56 and the magnets 36. However, when the camming mechanism 72 is moved to the unlocked position, the magnets 36 are magnetically attracted to the engagement members 56 thereby forcing or at least holding the engagement members 56 out of engagement with the engagement member 52.

Figure 18:
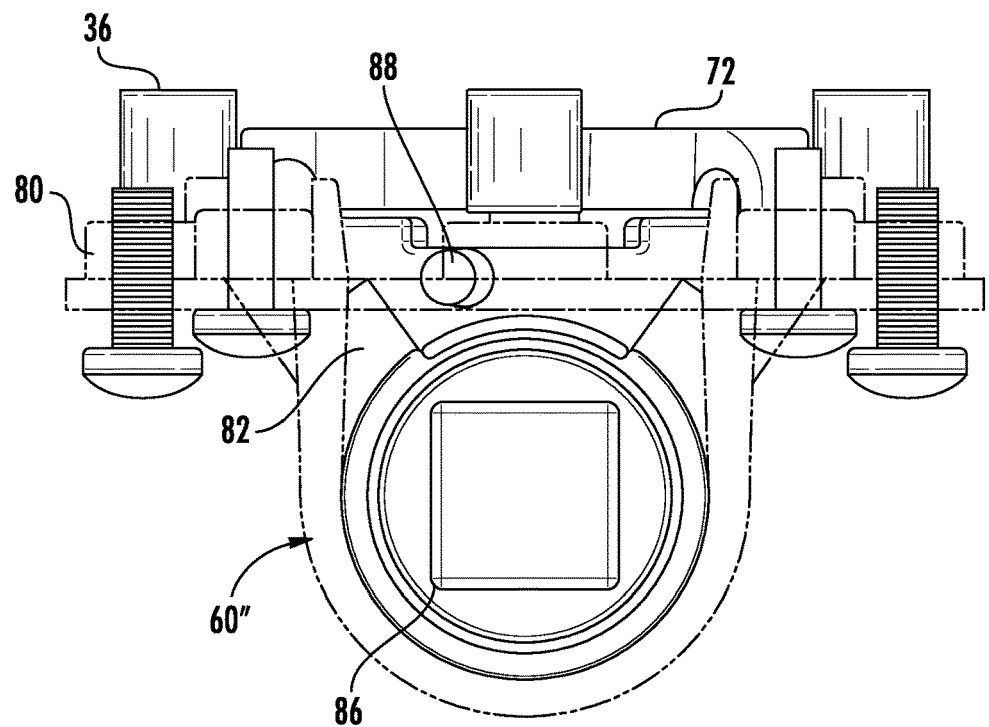
FIG. 18 is a side view of the lock mechanism shown in FIG. 16.
Figure 19:
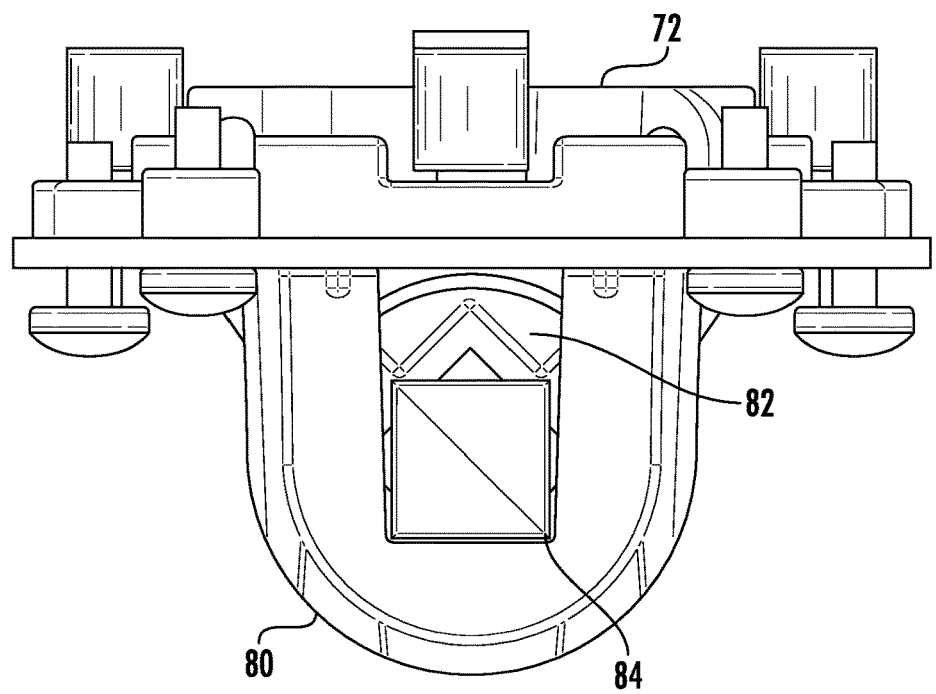
FIG. 19 is another side view of the lock mechanism shown in FIG. 16.
Figure 20:
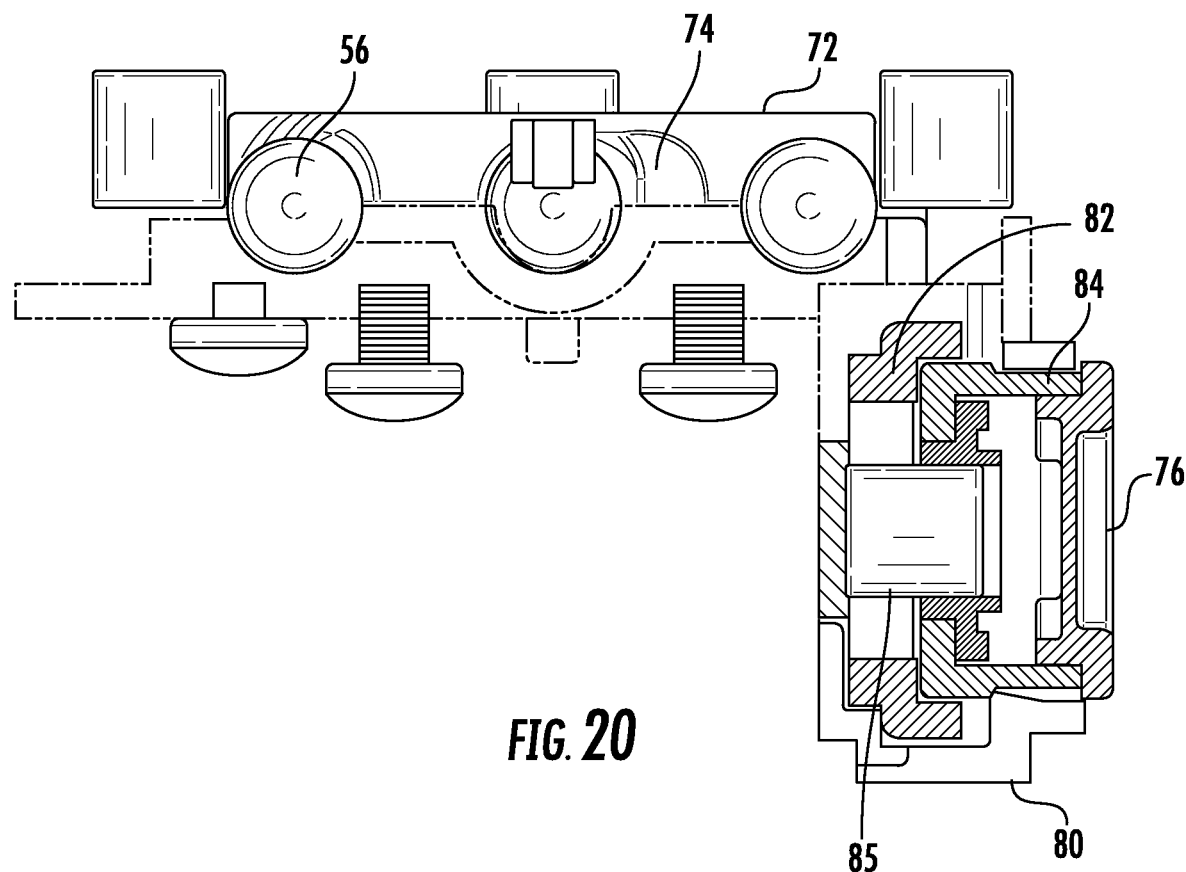
FIG. 20 is a cross-sectional view of the lock mechanism shown in FIG. 16.
Figure 21:
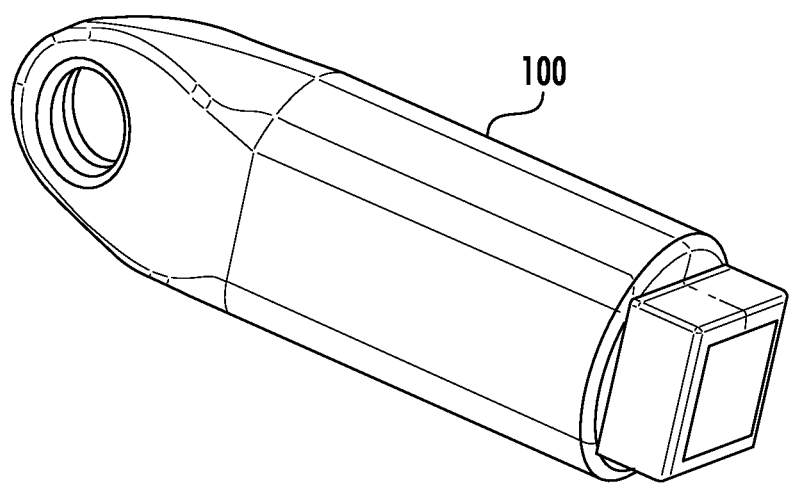
FIG. 21 is a perspective view of a key according to one embodiment of the present invention.

An actuator 60" may be used to move the camming mechanism 72 between locked and unlocked positions. In one embodiment, the actuator 60" may include a yoke mechanism 82, a shuttle 84, and a key receptacle 86. The yoke 82 and the shuttle 84 may be in engagement with one another at all times, while the shuttle is configured to engage and disengage the key receptacle 86, such as via a keyway-type of engagement. In some cases, the shuttle 84 is a magnetic shuttle (e.g., with a magnet 85) that is configured to be magnetically attracted to a key, such as in the form of a magnetic key 100 (see, e.g., FIG. 21). The magnetic key 100 may be configured to engage the key receptacle 86 and thereby magnetically attract and move the shuttle 84 into engagement with the key receptacle. Both the magnetic key 100 and the key receptacle 86 may have a matching shape (e.g., square or rectangular) for engaging one another (see, e.g., FIGS. 18-19). In some instances, the magnetic key 100 may move the shuttle 84 into a mating mechanical engagement with the key receptacle 86 (e.g., the shuttle may have a square or rectangular shaped portion that is received within a square or rectangular opening defined in the key receptacle). In this way, rotation of the magnetic key 100 while engaged with the key receptacle 86 also causes the yoke 82 to rotate. As shown in FIG. 18, the yoke 82 may be configured to rotate to engage a portion of the camming mechanism 72 for movement between the locked and unlocked positions. In the illustrated embodiment, the camming mechanism 72 includes a pin 88 that is configured to be engaged by the yoke 82 as the yoke is rotated either clockwise or counterclockwise. Less than a full rotation of the key receptacle 86 may be needed to move between the locked and unlocked positions. For example, a partial turn of 90 degrees or less may result in movement between the locked and unlocked positions. In some cases, minimal engagement or movement is needed between the yoke 82 and the camming mechanism 72 to move between the locked and unlocked positions, such as less than 45 degrees of rotation of the yoke in either a clockwise or counterclockwise rotation (e.g., 20-25 degrees or about 22.5 degrees).

Due to the fact that the yoke 82 and the shuttle 84 are not in engagement with the key receptacle 86 when the magnetic key 100 is not present or a key without a magnet is used, rotation of the key receptacle alone will not cause the yoke to rotate since the shuttle and the key receptacle are not engaged with one another. Rather, a magnetic key 100 is required in order to facilitate the engagement between the shuttle 84 and the key receptacle 86 and thereby engagement with the yoke 82. In order to prevent an unauthorized user from attempting to defeat the lock mechanism 50", such as by back driving the camming mechanism 72, the shuttle 84 may be configured to engage a portion of the retaining member 80, which is fixed, when the magnetic key 100 is not engaged with the key receptacle 86 (see, e.g., FIG. 19). In some cases, the shuttle 84 may be biased (e.g., with a spring) towards engagement with the retaining member 80 when the magnetic key 100 is not engaged with the key receptacle 86. The illustrated example shows that the shuttle 82 may have a portion that is shaped (e.g., square or rectangular) to mate with and engage a corresponding shaped portion of the retaining member 80 to thereby prevent rotation of the yoke 82 and the camming mechanism 72.

The foregoing has described one or more embodiments of merchandise security systems and methods for displaying and protecting an article of merchandise. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. A merchandise display system for displaying an article of merchandise comprising:
   a sensor configured to be secured to the article of merchandise;
   a base configured to removably support the sensor thereon, the base defining an opening configured to receive a portion of the sensor therein;
   a lock mechanism configured to lock the sensor to the base, the lock mechanism comprising at least one engagement member configured to releasably lock the sensor to the base when the sensor is supported on the base; and
   an actuator comprising a rotatable mechanism extending about the opening and configured to actuate the lock mechanism,
   wherein the rotatable mechanism is configured to rotate about the opening, and wherein rotation of the rotatable mechanism is configured to actuate the at least one engagement member to lock the sensor on the base in a locked position or unlock the sensor from the base in an unlocked position.

2. The merchandise display system of claim 1, further comprising a tether attached to the sensor at one end and an opposite end configured to be received through the opening.

3. The merchandise display system of claim 2, wherein an end of the tether comprises a connector configured to releasably engage the sensor.

4. The merchandise display system of claim 3, wherein the at least one engagement member is configured to engage the connector in the locked position.

5. The merchandise display system of claim 3, wherein the at least one engagement member is configured to engage the sensor in the locked position.

6. The merchandise display system of claim 1, wherein the sensor comprises a first engagement member and the at least one engagement member of the lock mechanism comprises at least one second engagement member configured to releasably engage the first engagement member, and wherein rotation of the rotatable mechanism is configured to cause the at least one second engagement member to move either into engagement with the first engagement member for locking the sensor on the base in the locked position or out of engagement with the first engagement member in the unlocked position.

7. The merchandise display system of claim 6, wherein the first engagement member comprises a slot.

8. The merchandise display system of claim 7, wherein the slot extends circumferentially.

9. The merchandise display system of claim 6, wherein the at least one second engagement member is configured to bias into or out of engagement with the first engagement member.

10. The merchandise display system of claim 6, wherein the at least one engagement member of the lock mechanism comprises a plurality of second engagement members, each second engagement member configured to engage the first engagement member.

11. The merchandise display system of claim 10, wherein the plurality of second engagement members comprises spherical members.

12. The merchandise display system of claim 6, wherein the at least one engagement member of the lock mechanism comprises at least three second engagement members, each of the at least three second engagement members is configured to engage the first engagement member.

13. The merchandise display system of claim 6, wherein the base comprises at least one magnet configured to magnetically attract the at least one second engagement member in the unlocked position.

14. The merchandise display system of claim 6, wherein the at least one second engagement member is configured to move radially inward into engagement with the first engagement member or radially outward out of engagement with the first engagement member.

15. The merchandise display system of claim 1, wherein the rotatable mechanism comprises a cam mechanism.

16. The merchandise display system of claim 1, wherein the rotatable mechanism extends about the entire circumference of the opening.

17. The merchandise display system of claim 1, wherein the actuator is configured to be actuated with a magnetic key.

18. The merchandise display system of claim 1, wherein the actuator is configured to be actuated with an electronic key.

19. The merchandise display system of claim 1, wherein the actuator is configured to be rotated for actuating the rotatable mechanism.

20. The merchandise display system of claim 1, wherein the actuator comprises a yoke mechanism, a shuttle, and a key receptacle, wherein the yoke and the shuttle are in engagement with one another and the shuttle is configured to engage and disengage the key receptacle.

21. The merchandise display system of claim 20, wherein the key receptacle is configured to be engaged by a key for moving the shuttle into engagement with the key receptacle.

22. The merchandise display system of claim 21, wherein the shuttle comprises a magnetically attractable material, and wherein the shuttle is configured to engage the key receptacle in response to engagement by a magnetic key.

23. The merchandise display system of claim 21, wherein the key receptacle is configured to be rotated when engaged with the shuttle for causing the yoke to rotate.

24. The merchandise display system of claim 23, wherein the yoke is configured to be rotated for engaging the rotatable mechanism.

25. The merchandise display system of claim 23, wherein the key receptacle is incapable of rotating the yoke when the key receptacle is not engaged with the shuttle.

26. The merchandise display system of claim 1, wherein the sensor is configured to rotate at least about 90 degrees with respect to the base while locked thereto.

27. The merchandise display system of claim 1, wherein the sensor is configured to freely rotate with respect to the base while locked thereto.

28. The merchandise display system of claim 1, wherein the lock mechanism and the rotatable mechanism are positioned within the base.

29. The merchandise display system of claim 1, further comprising a key configured to actuate the lock mechanism.

30. The merchandise display system of claim 1, wherein the rotatable mechanism extends about an axis of the opening and is configured to rotate about the axis of the opening.

31. The merchandise display system of claim 1, wherein the actuator is configured to actuate the lock mechanism in response to receiving a wireless signal.

32. The merchandise display system of claim 1, wherein the actuator comprises a motor or solenoid for actuating the lock mechanism.

33. A method for displaying an article of merchandise comprising:
securing a sensor to the article of merchandise;
positioning the sensor on a base configured to removably support the sensor thereon, the base defining an opening configured to receive a portion of the sensor therein; and
actuating a lock mechanism with an actuator to lock the sensor to the base when the sensor is supported on the base, the lock mechanism comprising at least one engagement member, the actuator comprising a rotatable mechanism extending about the opening and configured to actuate the lock mechanism, wherein the rotatable mechanism is configured to rotate about the opening, and wherein rotation of the rotatable mechanism is configured to actuate the at least one engagement member to lock the sensor on the base in a locked position or unlock the sensor from the base in an unlocked position.

34. The method of claim 33, wherein actuating comprising locking the sensor to the base via actuation of a key.

35. The method of claim 33, further comprising actuating the actuator for unlocking the sensor from the base such that the sensor is removable from the base.

36. The method of claim 33, wherein actuating comprising actuating the actuator in response to receiving a wireless signal.

* * * * *